US008325017B2

(12) United States Patent
Jo et al.

(10) Patent No.: US 8,325,017 B2
(45) Date of Patent: Dec. 4, 2012

(54) TIME SLOT ALLOCATION APPARATUS AND METHOD FOR PREVENTING COLLISIONS BETWEEN TIME SLOTS IN TDMA-BASED RFID NETWORK

(75) Inventors: Geun Sik Jo, Incheon (KR); Seung Bo Park, Bucheon-si (KR); Young Hoon Yu, Incheon (KR)

(73) Assignee: INHA-Industry Partnership Institute, Incheon (KR)

( * ) Notice: Subject to any disclaimer, the term of this patent is extended or adjusted under 35 U.S.C. 154(b) by 1122 days.

(21) Appl. No.: 12/064,739

(22) PCT Filed: Nov. 16, 2007

(86) PCT No.: PCT/KR2007/005775
§ 371 (c)(1),
(2), (4) Date: Feb. 25, 2008

(87) PCT Pub. No.: WO2009/038247
PCT Pub. Date: Mar. 26, 2009

(65) Prior Publication Data
US 2010/0176926 A1 Jul. 15, 2010

(30) Foreign Application Priority Data
Sep. 21, 2007 (KR) .................. 10-2007-0096781

(51) Int. Cl.
*H04Q 5/22* (2006.01)
*H04L 12/43* (2006.01)

(52) U.S. Cl. ..................... 340/10.2; 370/458
(58) Field of Classification Search ............ 340/1.1, 340/10.1, 10.2, 3.41, 572.1, 10, 670, 584; 370/321, 458
See application file for complete search history.

(56) References Cited

U.S. PATENT DOCUMENTS

| 5,483,537 | A  | * | 1/1996  | Dupuy        | 370/337 |
|-----------|----|---|---------|--------------|---------|
| 6,134,692 | A  | * | 10/2000 | Sekiya et al.| 714/749 |
| 6,711,408 | B1 | * | 3/2004  | Raith        | 455/440 |
| 6,804,521 | B2 | * | 10/2004 | Tong et al.  | 455/450 |
| 6,901,066 | B1 | * | 5/2005  | Helgeson     | 370/348 |
| 6,980,541 | B2 | * | 12/2005 | Shvodian     | 370/346 |

(Continued)

OTHER PUBLICATIONS

Daniel W. Engels; White Paper—The Reader Collision Problem; Auto-ID Center Massachusetts Institute of Technology; Nov. 1, 2001; pp. 1-22.

(Continued)

*Primary Examiner* — Brian Zimmerman
*Assistant Examiner* — An T Nguyen
(74) *Attorney, Agent, or Firm* — H.C. Park & Associates, PLC (57) ABSTRACT

The present invention relates to a time slot allocation apparatus and method for preventing collisions between time slots in a TDMA-based RFID network. The time slot allocation apparatus allocates time slots, obtained by dividing a same frequency band into unit time slots, to RFID readers for reading identification codes of RFID tags (10) in the TDMA-based RFID network. A time slot allocation device (33a) allocates time slots required for communication with the RFID tags to a plurality of RFID readers (20) provided in the RFID network. A collision prevention device (33b) performs control such that the time slot allocation device allocates time slots to the plurality of RFID readers while distributing different and non-successive time slots to adjacent RFID readers, thus preventing collisions from occurring between time slots allocated to the RFID readers.

15 Claims, 9 Drawing Sheets

U.S. PATENT DOCUMENTS

| | | | |
|---|---|---|---|
| 7,253,717 B2* | 8/2007 | Armstrong et al. | 340/10.2 |
| 7,692,532 B2* | 4/2010 | Fischer et al. | 340/10.2 |
| 2002/0001294 A1* | 1/2002 | Amouris | 370/337 |
| 2002/0042274 A1* | 4/2002 | Ades | 455/445 |
| 2002/0063622 A1* | 5/2002 | Armstrong et al. | 340/10.31 |
| 2002/0175805 A9* | 11/2002 | Armstrong et al. | 340/10.31 |
| 2005/0201340 A1* | 9/2005 | Wang et al. | 370/337 |
| 2006/0022800 A1* | 2/2006 | Krishna et al. | 340/10.2 |
| 2006/0022815 A1* | 2/2006 | Fischer et al. | 340/505 |
| 2006/0076401 A1* | 4/2006 | Frerking | 235/380 |
| 2006/0082454 A1* | 4/2006 | Fukuda et al. | 340/531 |
| 2006/0128384 A1* | 6/2006 | Jagadeesan et al. | 455/436 |
| 2007/0001813 A1* | 1/2007 | Maguire et al. | 340/10.2 |
| 2007/0060156 A1* | 3/2007 | Cave | 455/450 |
| 2007/0133592 A1* | 6/2007 | Zheng et al. | 370/458 |
| 2007/0139163 A1* | 6/2007 | Powell et al. | 340/10.2 |
| 2008/0122581 A1* | 5/2008 | Bae et al. | 340/10.2 |
| 2009/0040044 A1* | 2/2009 | Chiao et al. | 340/540 |
| 2009/0102675 A1* | 4/2009 | Arteaga et al. | 340/670 |
| 2010/0109847 A1* | 5/2010 | Noel et al. | 340/10.2 |
| 2010/0176926 A1* | 7/2010 | Jo et al. | 340/10.2 |
| 2010/0207737 A1* | 8/2010 | Park et al. | 340/10.2 |

OTHER PUBLICATIONS

James Waldrop et al; Colorwave: An Anticollision Algorithm for the Reader Collision Problem; pp. 1206-1210; 2003 IEE.

Surgwon Sohn et al; Frequency Assignment for Low Power FM Broadcasting Using Constraint Satisfaction Techniques.

Dong-Her Shih et al; Taxonomy and Survey of RFID Anti-Collision Protocols; Computer Communications 29; 2006; pp. 2150-2166.

Kin Seong Leong, et al; The Reader Collision Problem in RFID Systems; Auto-IDS Laboratory, Department of Electrical & Electronic Engineering, The University of Adelaide.

* cited by examiner

Fig. 1

<a: INTERFERENCE BETWEEN READERS>

<b: INTERFERENCE BETWEEN READER AND TAG>

TIME SLOT ALLOCATION APPARATUS AND METHOD FOR PREVENTING COLLISIONS BETWEEN TIME SLOTS IN TDMA-BASED RFID NETWORK

BACKGROUND OF THE INVENTION

1. Field of the Invention

The present invention relates, in general, to a time slot allocation apparatus and method for preventing collisions between time slots in a Time Division Multiple Access (TDMA)-based Radio Frequency Identification (RFID) network, and, more particularly, to a time slot allocation apparatus and method for preventing collisions between time slots in a TDMA-based RFID network, which can rapidly transmit a minimum number of time slots to RFID readers while eliminating interference between the RFID readers in the TDMA-based RFID network.

2. Description of the Related Art

Generally, Radio Frequency Identification (RFID) is a non-contact type recognition system for transmitting and processing information about objects or surrounding environments using a small-sized semiconductor chip, and is predicted to be the technology that will replace barcodes, because direct contact and scanning are not required.

Further, an RFID network is configured such that identification codes required to identify objects or animals having RFID tags attached thereto are received through communication between a plurality of RFID readers and a plurality of RFID tags, and such that the identification codes are collected and filtered through RFID middleware and are transmitted to a central server, and data about the objects or animals can be obtained on the basis of the data about the identification codes stored in a database.

In this case, in order to conduct communication between RFID readers present in an RFID network and RFID tags, frequency collisions must be prevented from occurring. Frequency collisions can be classified into frequency collisions occurring between RFID readers, and frequency collisions occurring between RFID readers and an RFID tag, and are described with reference to the attached drawing.

Figure 1:
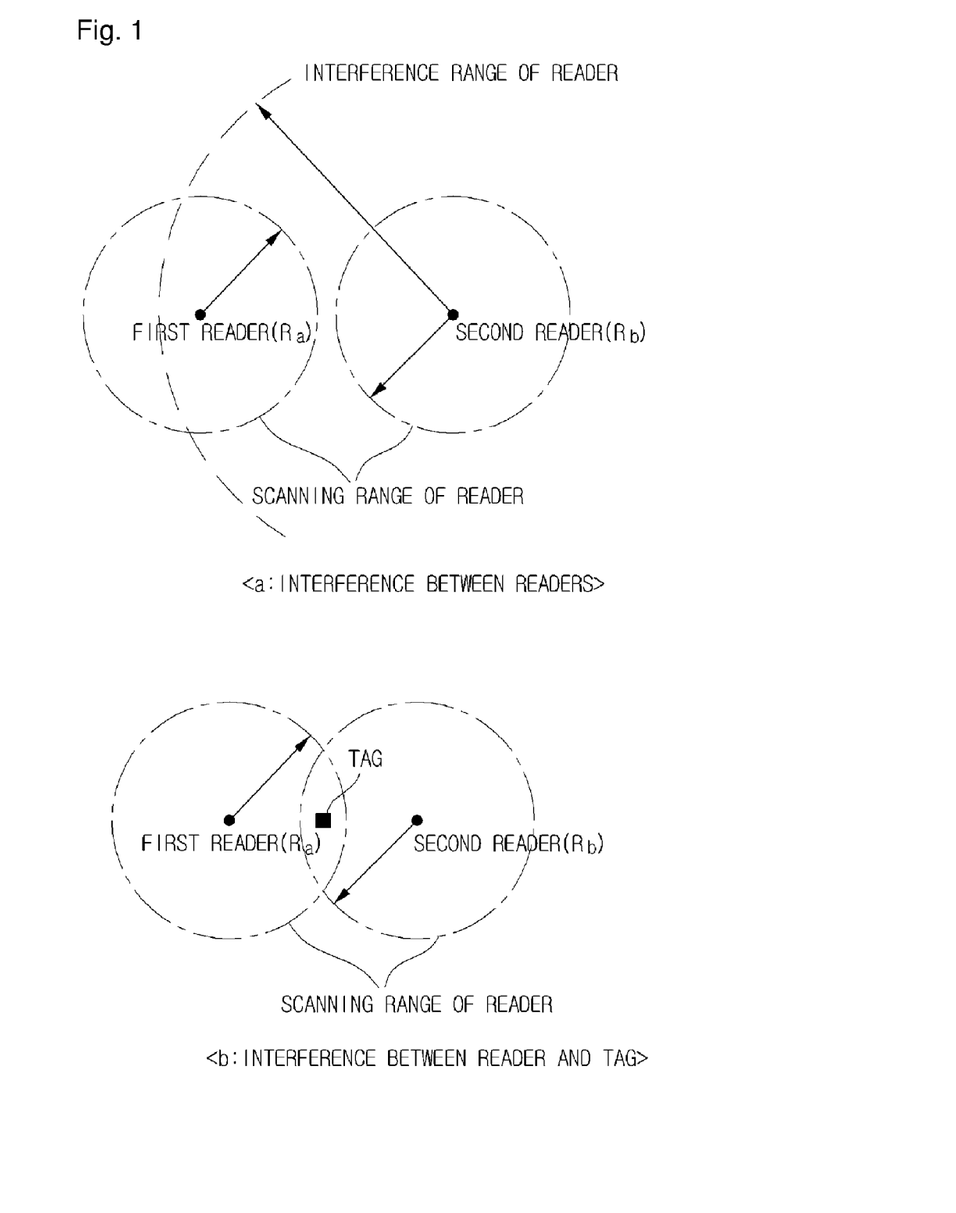
FIG. 1 is a diagram showing interference between RFID readers and interference between RFID readers and a tag occurring in an RFID network.

FIG. 1 is a diagram showing interference between RFID readers and interference between RFID readers and an RFID tag, occurring in an RFID network. As shown in FIG. 1, each RFID reader receives data about an RFID tag placed within the radius of the RFID reader in which the radio waves of the RFID reader can be reached, in the RFID network.

Further, since a plurality of RFID readers driven through the above operation is present in the RFID network, the case where, when an arbitrary RFID reader transmits radio waves and reads an identification code included in an RFID tag, the transmitted radio waves may reach another RFID reader, may occur. This case is shown in (a) in FIG. 1.

Meanwhile, since a plurality of RFID readers driven through the above operation is present in the RFID network, the case where, when two RFID readers transmit radio waves and read an identification code included in the same RFID tag, frequency interference occurs, and thus the RFID readers cannot accurately read the identification code, may occur. Such a case is shown in (b) in FIG. 1.

As described above, interference with RFID readers, such as interference between RFID readers, or a collision occurring when a plurality of RFID readers simultaneously attempts to connect to the same RFID tag, is commonly called a collision between RFID readers.

In order to solve this collision, a method of randomly allocating time slots to RFID readers, and a method of randomly allocating time slots to prevent the occurrence of interference while minimizing the number of time slots allocated to each RFID reader, may be used.

The former allocation method is configured to allocate different time slots to all RFID readers, and the latter allocation method is configured to allocate time slots to RFID readers so as to prevent all RFID readers from interfering with each other while changing the time slots of RFID readers in which interference occurred.

However, the former allocation method is problematic in that, since different time slots are designated, the number of time slots increases, and the scanning period of RFID readers is lengthened, thus the performance of sensing the movement of RFID tags is deteriorated. In addition, the latter allocation method is problematic in that, since random time slots are designated in RFID readers in which interference occurred, a time slot must be designated again when the same time slot is randomly designated, so that the time taken for trial and error is increased, and an optimal solution cannot be found.

SUMMARY OF THE INVENTION

In order to rapidly transmit a minimum number of time slots to RFID readers while eliminating interference between RFID readers, the present invention selects a method of allocating time slots, which are different and are non-successive, to adjacent RFID readers, allocating time slots, which are as close to each other as possible, to adjacent RFID readers so as to increase the speed at which moving RFID tags are sensed, and minimizing the number of allocated time slots to reduce the scanning period, as a method of preventing the occurrence of collisions between time slots, thus selecting the very near time slot of the selected time slot to improve sensing capability for moving RFID tags.

In order to accomplish the above objects, the present invention provides a time slot allocation apparatus for preventing collisions between time slots in a Time Division Multiple Access (TDMA)-based Radio Frequency Identification (RFID) network, the apparatus allocating time slots, obtained by dividing a same frequency band into unit time slots, to RFID readers for reading identification codes of RFID tags in the TDMA-based RFID network, comprising a time slot allocation device for allocating time slots required for communication with the RFID tags to a plurality of RFID readers provided in the RFID network; and a collision prevention device for performing control such that the time slot allocation device allocates time slots to the plurality of RFID readers while distributing different and non-successive time slots to adjacent RFID readers, thus preventing collisions from occurring between time slots allocated to the RFID readers.

Preferably, the collision prevention device may perform control such that three to six time slots are interposed between the time slots allocated to the adjacent RFID readers in order to read each moving RFID tag.

Preferably, the collision prevention device may perform control such that one to four time slots are interposed between time slots allocated to the adjacent RFID readers in order to eliminate temporal interference between the time slots.

Preferably, the collision prevention device may enable a number of time slots allocated to all RFID readers provided in the RFID network to be minimized.

Preferably, both the time slot allocation device and the collision prevention device may be provided in an RFID interface for connection to the RFID readers.

Further, the present invention provides a time slot allocation method for preventing collisions between time slots in a Time Division Multiple Access (TDMA)-based Radio Frequency Identification (RFID) network, the method allocating time slots, obtained by dividing a same frequency band into unit time slots, to RFID readers for reading identification codes of RFID tags in the TDMA-based RFID network, comprising a first step of causing a time slot allocation device, which allocates time slots for communication with the RFID tags to a plurality of RFID readers provided in the RFID network, to allocate an arbitrary time slot to an arbitrary RFID reader; a second step of allocating a time slot to an RFID reader adjacent to the arbitrary RFID reader so that a collision prevention device allocates a time slot, which is different from the arbitrary time slot and is non-successive to the arbitrary time slot, to the adjacent RFID reader in order to eliminate temporal interference between respective RFID readers provided in the RFID network; and a third step of allocating time slots to the arbitrary RFID reader and the adjacent RFID reader so that a certain number of time slots is interposed between the time slots allocated to the arbitrary RFID reader and the adjacent RFID reader in order to read a moving RFID tag.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 2:
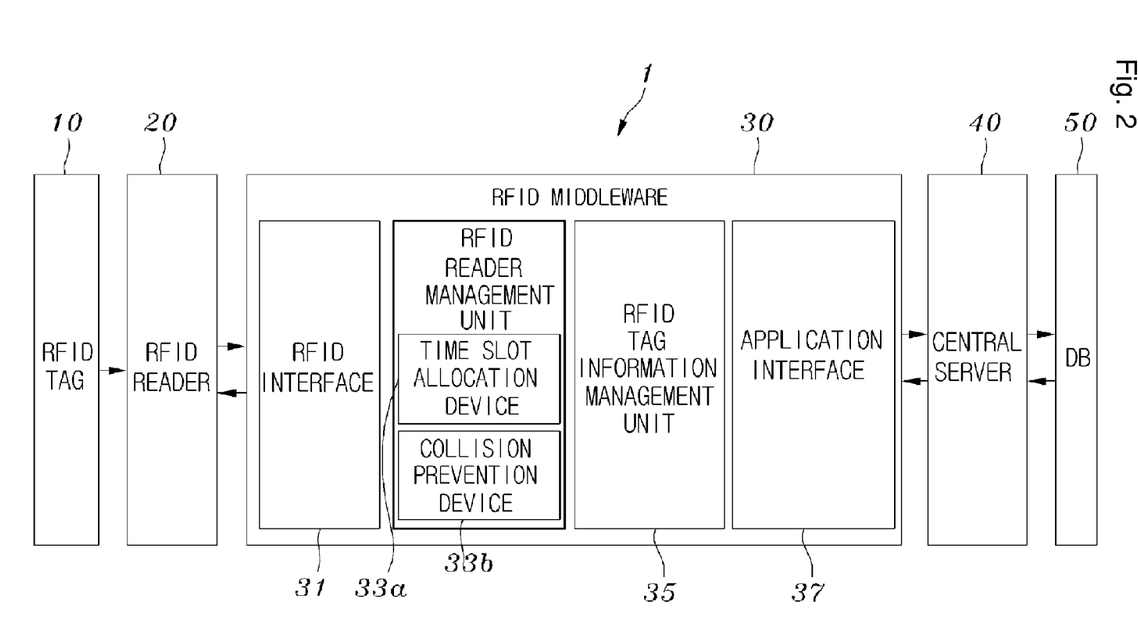
FIG. 2 is a block diagram schematically showing a TDMA-based RFID network including a time slot allocation apparatus for preventing collisions between time slots according to the present invention.
Figure 3:
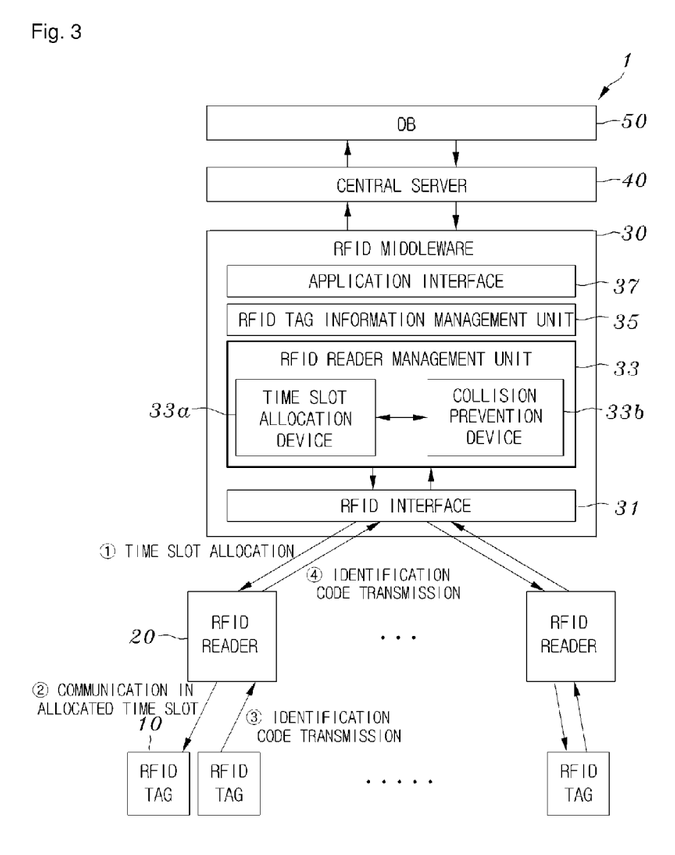
FIG. 3 is a block diagram schematically showing a process for driving a TDMA-based RFID network including a time slot allocation apparatus for preventing collisions between time slots according to the present invention.

FIG. 2 is a block diagram schematically showing a TDMA-based RFID network including a time slot allocation apparatus for preventing collisions between time slots according to the present invention, and FIG. 3 is a block diagram schematically showing a process for driving a TDMA-based RFID network including a time slot allocation apparatus for preventing collisions between time slots according to the present invention.

As shown in the drawings, the TDMA-based RFID network including the time slot allocation apparatus for preventing collisions between time slots according to the present invention includes a plurality of RFID tags 10, a plurality of RFID readers 20 for reading identification codes included in the RFID tags 10, RFID middleware for transmitting information about the RFID tags 10 read by the RFID readers 20 to a central server 40, the central server 40 for managing the identification codes of the RFID tags 10 transmitted from the RFID middleware 30, and a database 50 for storing the identification codes transmitted from the central server 40.

Each RFID tag 10 can be configured to be attached to an object, to be formed in the shape of a thin plane, and to include a transponder chip manufactured as a semiconductor and an antenna, and can be manufactured in a passive type or an active type.

When the RFID tag 10 is manufactured in a passive type, the RFID tag is preferably operated while being supplied with energy from radio wave signals received from the RFID readers 20, without requiring internal power. Further, when the RFID tag 10 is manufactured in an active type, the RFID tag is preferably configured to have an internal battery so as to operate by itself.

The RFID tag 10 includes therein an identification code, thus enabling an object to which the RFID tag 10 is attached to be identified. The identification code stored in the RFID tag 10 and data having content indicated by the identification code are preferably arranged in a table and are preferably stored in advance in the database 50.

Further, each RFID reader 20 is configured to read an identification code, which is unique information required to identify an object to which the RFID tag 10 is attached, from the RFID tag 10.

In this case, the TDMA-based RFID network 1 according to the present invention divides the same frequency band into unit time slots, and allocates the time slots obtained through frequency band division to respective RFID readers 20 so as to communicate with an RFID tag 10, thus allowing the RFID reader 20 to exclusively use the frequency band in a given time slot. Accordingly, communication between the RFID reader 20 and the RFID tag 10 is enabled in the given time slot.

The term 'Time Division Multiple Access: TDMA' means a time division multiple access method of performing mutual communication so that a plurality of base stations performs multiple access via a single repeater in data communication, and the same frequency band is divided into a plurality of unit time slots to prevent signals from overlapping.

Further, TDMA is characterized in that, when multiple access is performed via a single repeater, carrier waves form a single wave even if the carrier waves are simultaneously amplified, and thus the repeater can be operated in a saturation region regardless of an increase in the number of accessing base stations, and in that, since the data transmission time of a single transmission channel is divided into time slots regardless of the amount of data to be actually transmitted, efficiency may be decreased, but only the identification code of the RFID tag 10 is transmitted in the RFID network, and thus TDMA can be efficiently applied to the RFID network.

Further, the RFID middleware 30 functions to extract data from the RFID readers 20, to perform processing, such as collection, filtering and information aggregation, on the extracted data, and to transmit the processed data to the central server 40, and is configured by combining the characteristics of RFID with the basic function of an Automatic Data Collection (ADC) server for collecting data from ADC equipment, such as the RFID reader 20, and transmitting the collected data to a network/application.

The middleware is software for connecting heterogeneous types of hardware, protocols or communication environments in a distributed computing environment, and enabling satisfactory communication to be performed between an application program and environments in which the application program is operated, the middleware being provided to perform communication between application programs and the operating environments thereof in heterogeneous environments.

The RFID middleware 30 includes an RFID interface 31 for providing a path for connection to each of the RFID readers 20, an RFID reader management unit 33 for allocating time slots required for the RFID readers 20 to communicate with RFID tags 10, and managing the RFID readers 20, an RFID tag information management unit 35 for managing the identification codes of the RFID tags 10 received from the RFID interface 31, and an application interface 37 for providing a connection path required to transmit the identification codes to the central server 40.

Further, the RFID reader management unit 33 and the RFID tag information management unit 35 may be preferably included in the RFID interface 31 to allow the RFID interface 31 itself to allocate time slots and to perform collection, filtering, and information aggregation on identification codes.

The RFID reader management unit 33 includes a time slot allocation device 33a for allocating time slots, obtained by dividing the same frequency band into unit time slots, and a collision prevention device 33b for preventing collisions from occurring when the time slots are allocated to the RFID readers 20.

The time slot allocation device 33a allocates time slots required for communication with the RFID tags 10 to the plurality of RFID readers 20 provided in the RFID network 1.

The collision prevention device 33b performs control such that time slots are allocated to the plurality of RFID readers 20, but are allocated on the basis of the following three constraints.

First, a constraint satisfaction problem (hereinafter referred to as a 'CSP') can be approached, which includes a set of a finite number of variables having finite domains, and a condition required to form a connection between the domains and the set of variables.

In other words, CSP is a method of solving a problem using a heuristic technique, which is a problem solving technique for forming an estimation mechanism using data within a possible range, and performing analysis to obtain a result approximate to an optimal solution from the estimation mechanism when required information is insufficient and analytic access is impossible.

It is assumed that a plurality of RFID readers 20 according to the present invention is a finite number of variables V having finite domains, a finite number of time slots allocated to the RFID readers 20 is domains D, and the condition required to determine the relationship between the RFID readers 20 and the time slots is a constraint C, which can be expressed in the following Math FIG. 1.

$$V:\text{RFID reader}=[R_1, R_2, R_3, \ldots, R_m]$$

$$D:\text{time slot}=[ts_1, ts_2, ts_3, \ldots, ts_n]$$

$$C:\text{constraint} \quad \text{[Math FIG. 1]}$$

In this case, R denotes RFID readers, ts denotes time slots, m denotes the number of RFID readers 20, and n denotes the number of time slots.

Further, of the constraints, the first constraint is given in the following Math FIG. 2.

$$ts_i \neq ts_j \quad \text{[Math FIG. 2]}$$

This shows a constraint indicating that two RFID readers 20, which are sets of variables having domains, that is, time slots, cannot use the same time slot as long as they are not spaced sufficiently far apart from each other, and interference occurs between the RFID readers.

*59
*Further, of the constraints, the second constraint is given in the following Math FIG. [3].

$$|ts_i - ts_j| \geq d(d \approx 2) \quad \text{[Math FIG. 3]}$$

This shows a constraint indicating that, since temporal interference may occur between time slots allocated to adjacent RFID readers 20, non-successive time slots are selected, and thus limitation is performed to prevent interference from occurring due to reflective waves or radio waves attributable to a time delay.

For example, when $ts_1$, which is a time slot from 0 to 0.4 seconds, is allocated to an arbitrary RFID reader ($R_i$) 20, and $ts_2$, which is a time slot from 0.4 to 0.8 seconds, is allocated to an RFID reader ($R_j$) 20 adjacent to the RFID reader ($R_i$) 20, the RFID reader ($R_i$) 20 communicates with a given RFID tag 10 during a time period from 0 to 0.4 seconds, and the adjacent RFID reader ($R_j$) 20 communicates with a given RFID tag during a time period from 0.4 to 0.8 seconds.

In the above case, the arbitrary RFID reader ($R_i$) 20 and the RFID reader ($R_j$) 20 are adjacent to each other. Therefore, when a time delay occurs, and the arbitrary RFID reader ($R_i$) 20 reads the RFID tag 10 during a time period from 0 to 0.5 seconds, the adjacent RFID reader ($R_j$) 20 reads the RFID tag 10 during a time period from 0.4 to 0.8 seconds. As a result, RFID readers 20 using the same frequency band during the time period from 0.4 to 0.5 seconds are placed adjacent to each other, and thus temporal interference occurs. Accordingly, adjacent is RFID readers 20 are prevented from using successive time slots.

Preferably, the number of time slots interposed between allocated time slots is defined as 1 ($d \approx 2$) so as to prevent the time slots from being successively arranged, but the number of time slots interposed between allocated time slots may be set as high as 4 ($d \approx 5$).

Further, of the constraints, a third constraint is given in the following Math FIG. 4.

$$|ts_i - ts_j| \leq e(e \approx 4) \quad \text{[Math FIG. 4]}$$

This shows the constraint required to allocate time slots on the basis of TDMA, and indicates that control must be performed so that time slots, which are as close to each other as possible, are allocated to adjacent RFID readers 20.

That is, in order to prevent temporal interference from occurring between adjacent RFID readers 20, successive time slots cannot be allocated, and, moreover, if the movement speed of an RFID tag 10 is too high to allow the RFID reader 20 to scan the RFID tag 10 within an allocated time slot during the movement of the RFID tag 10, two adjacent RFID readers 20 cannot read the identification code of the RFID tag 10.

Therefore, the frequency band is divided into unit time slots in consideration of the movement speed of an object or an animal having a typical RFID tag 10 attached thereto, and a constraint indicating that, when the time slots, obtained from the division, are allocated to adjacent RFID readers 20, they must be set as close to each other as possible, is taken into consideration.

For example, when time slots are arranged at intervals of 0.4 seconds through frequency band division, and a time slot $ts_1$ from 0 to 0.4 seconds is allocated to an arbitrary is RFID reader ($R_i$) 20, a time slot no later than a time slot $ts_4$ from 1.2 to 1.6 seconds must be allocated to an RFID reader ($R_j$) 20 adjacent to the arbitrary RFID reader ($R_i$) 20. Accordingly, even if an RFID tag 10 passing through the arbitrary RFID reader ($R_i$) 20 could not be read due to the movement speed thereof during the time period from 0 to 0.4 seconds, the adjacent RFID reader ($R_j$) 20 can read the RFID tag 10 during the time period from 1.2 to 1.6 seconds.

Preferably, in this embodiment, the number of time slots interposed between allocated time slots is set to 3 (e≈4) so that time slots close to each other can be allocated to adjacent RFID readers 20, but, alternatively, the number of time slots interposed between allocated time slots can be set as high as 6 (e≈7).

In various cases allocated to the three constraints, time slots are allocated to RFID readers using an allocation method of minimizing the number of time slots allocated to the RFID network 1, which is given in the following Math FIG. 5.

$$\min \sum_{i=1}^{n} \text{Occurred}(ts_i)$$ [Math FIG. 5]

In this case, n denotes the number of time slots allocated to the RFID network 1, and Occurred( ) denotes the function required to determine whether each time slot has been used, which aims to allocate time slots according to an allocation method in which the number of time slots used is a minimum value (min) in each case.

That is, the fact that the number of time slots allocated to all RFID readers 20 present in the RFID network 1 is a minimum value means that the time taken for all RFID readers 20 present in the RFID network 1 to read the identification codes of corresponding RFID tags 10 is minimized. Accordingly, the period for which RFID tags 10 present in the RFID network 1 are scanned is shortened, so that the movement and fluctuation of each RFID tag 10 is can be sensed because of short periodicity, and the accuracy of scanning is improved.

Therefore, in the TDMA-based RFID network according to the present invention, the time slot allocation apparatus for preventing collisions between time slots is configured to improve sensing capability for the movement and fluctuation of each RFID tag 10 and to enhance sensing performance.

Figure 4:
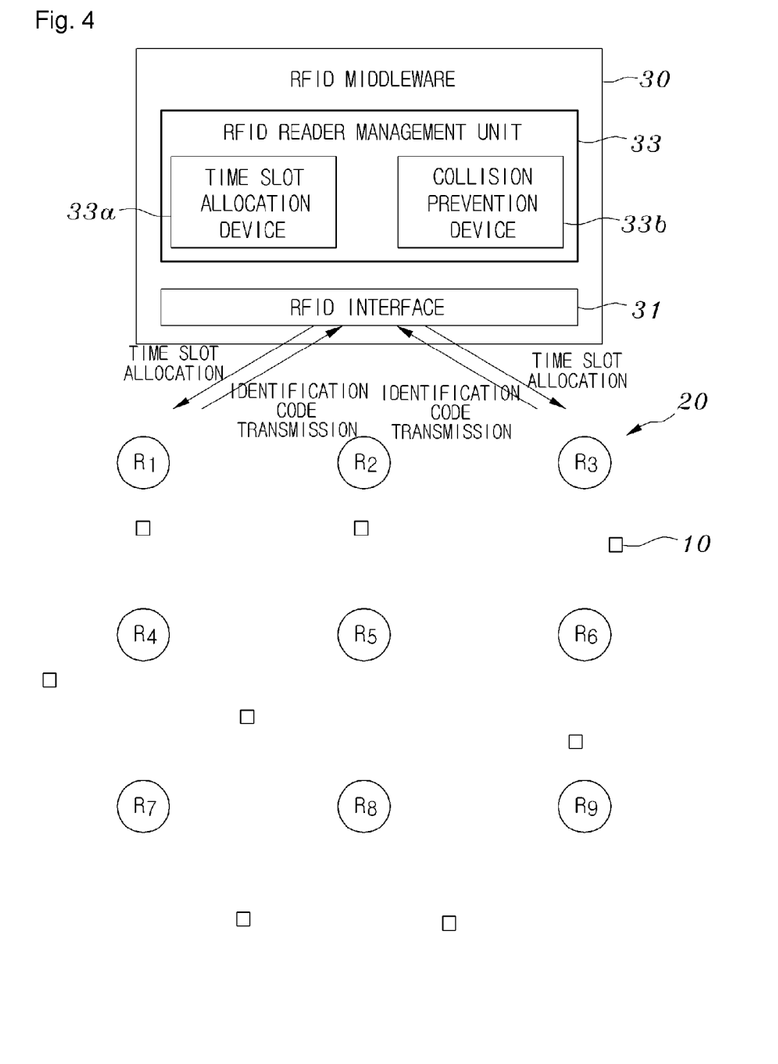
FIG. 4 is a block diagram schematically showing an embodiment in which a time slot allocation device and a collision prevention device according to the present invention are included in an RFID management unit.
Figure 5:
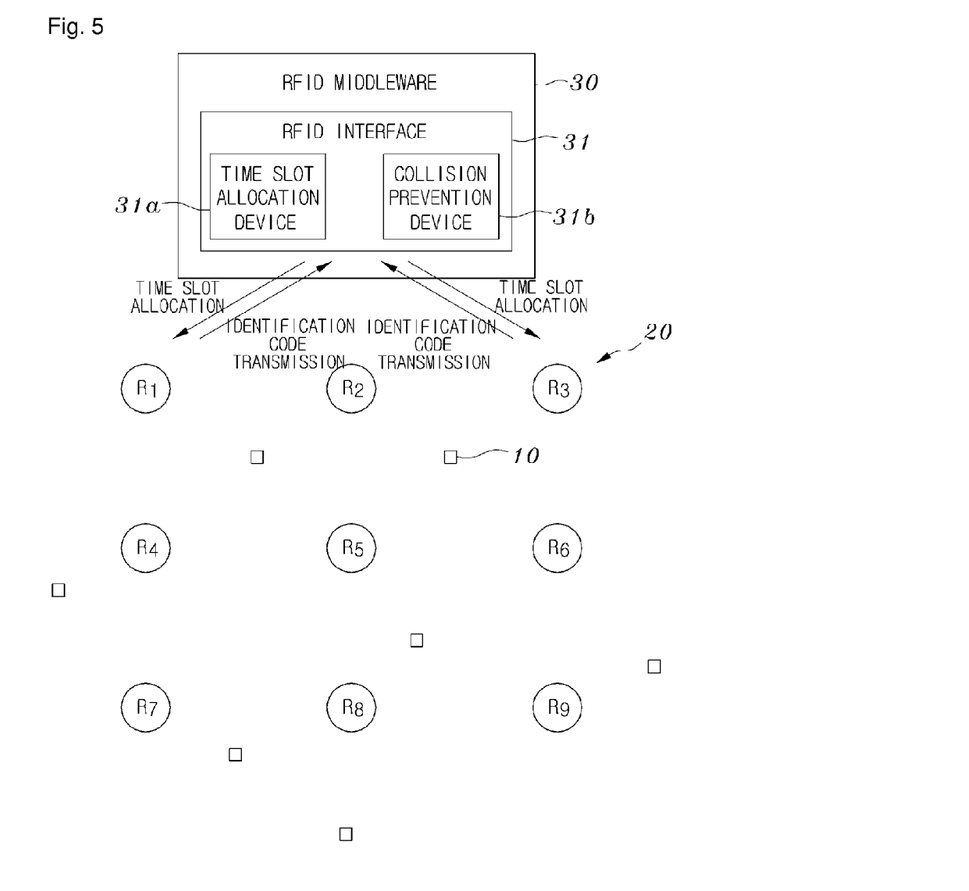
FIG. 5 is a block diagram schematically showing an embodiment in which a time slot allocation device and a collision prevention device according to the present invention are included in an RFID interface.

FIG. 4 is a block diagram schematically showing an embodiment in which a time slot allocation device and a collision prevention device according to the present invention are included in an RFID management unit; and FIG. 5 is a block diagram schematically showing an embodiment in which a time slot allocation device and a collision prevention device according to the present invention are included in an RFID interface.

As shown in the drawings, the time slot allocation apparatus for preventing collisions between time slots in a TDMA-based RFID network according to the present invention may be included in either the RFID management unit 33 or the RFID interface 31.

In this case, when time slots are allocated to RFID readers 20 present in the RFID network 1 on the basis of the three constraints, the RFID readers 20 exclusively use a given frequency band for respective allocated time slots, and thus communicate with corresponding RFID tags 10.

Accordingly, each RFID tag 10 transmits an identification code, required to identify an object or an animal having the RFID tag 10 attached thereto, to a corresponding RFID reader 20. As a result, the RFID middleware 30 performs processing, such as collection and filtering, on the information, and transmits the processed information to the central server (not shown).

Figure 6:
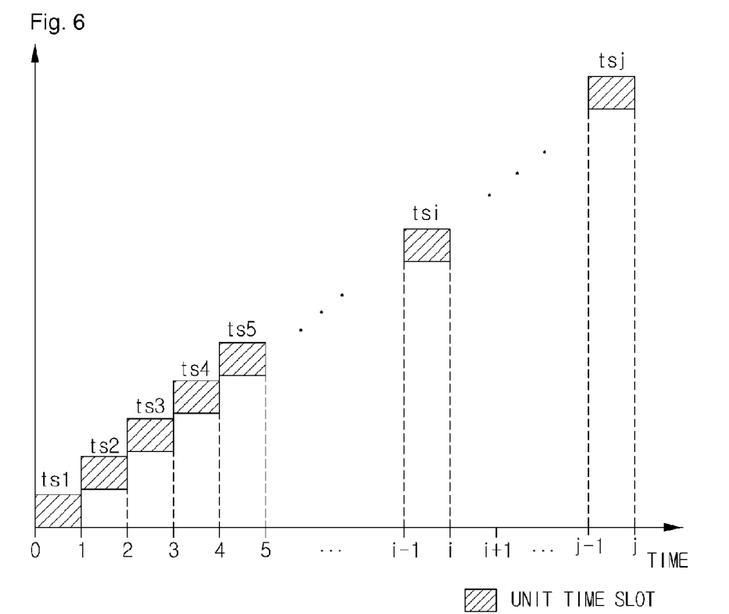
FIG. 6 is a diagram schematically showing time slots according to the present invention.
Figure 7:
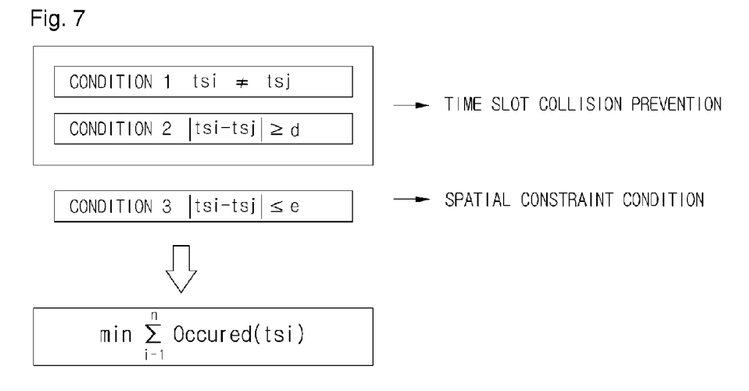
FIG. 7 is a diagram schematically showing conditions in which a time slot allocation apparatus for preventing collisions between time slots allocates time slots to RFID readers according to the present invention.
Figure 8:
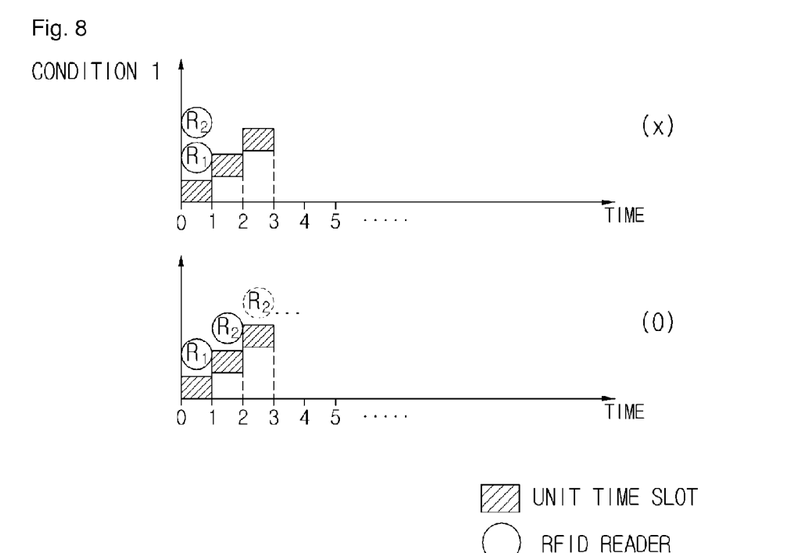
FIG. 8, FIG. 9, FIG. 10 is a diagram showing embodiments in which time slots are allocated on the basis of the time slot allocation conditions of FIG. 7.
Figure 9:
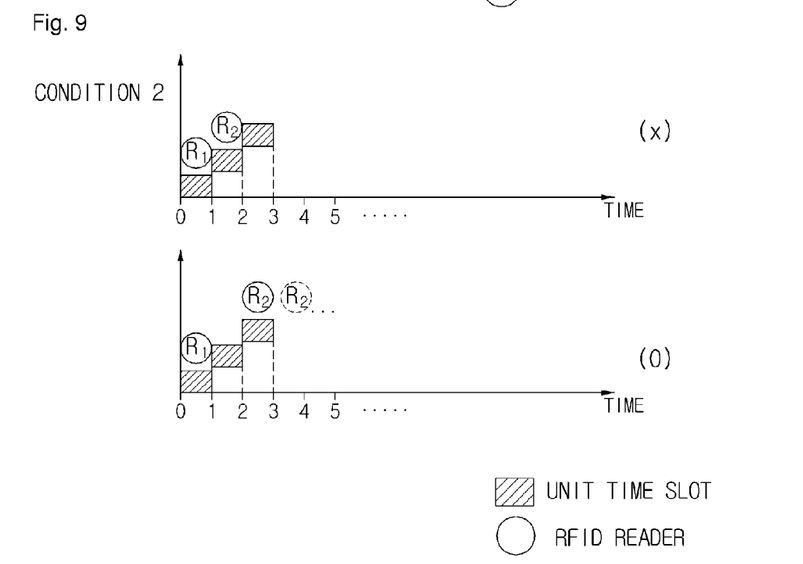
Figure 10:
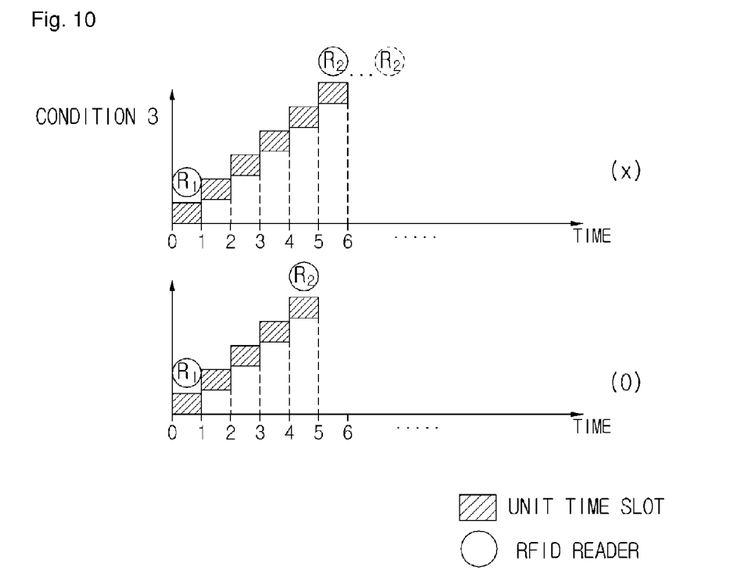

FIG. 6 is a diagram schematically showing time slots according to the present invention, FIG. 7 is a diagram schematically showing conditions in which the time slot allocation apparatus for preventing collisions between time slots according to the present invention allocates time slots to RFID readers, and FIG. 8, FIG. 9, and FIG. 10 are diagrams showing an embodiment in which time slots are allocated on the basis of the time slot allocation conditions of FIG. 7.

As shown in the drawings, time slots according to the present invention can be obtained by dividing the same frequency band into unit time slots so that a plurality of RFID readers 20 can share the same frequency band with each other.

The time slots are distributed on the basis of the time slot collision prevention and spatial constraints given in Math FIGS. 2, 3 and 4, but are distributed so that a minimum number of time slots can be distributed, as shown in Math FIG. 5.

Further, (a) FIG. 8 illustrates the cases where the first constraint of Math FIG. 2 is not satisfied and is satisfied, respectively. The allocation method indicated by (X) shows the case where the same time slot is distributed to adjacent RFID readers (R1 and R2) 20, and the allocation method indicated by (O) shows the case where the same time slot is not distributed to adjacent RFID readers (R1 and R2) 20.

Further, (b) FIG. 9 illustrates the cases where a second constraint of Math FIG. 3 is not satisfied and is satisfied, respectively. The allocation method indicated by (X) shows the case where successive time slots are distributed to adjacent RFID readers (R1 and R2) 20, and the allocation method indicated by (O) shows the case where successive time slots are not distributed to adjacent RFID readers (R1 and R2) 20.

Further, (c) FIG. 10 shows the cases where the third constraint of Math FIG. 4 is not satisfied and is satisfied, respectively. The allocation method indicated by (X) shows the case where time slots close to each other are not distributed to adjacent RFID readers (R1 and R2) 20, and the allocation method indicated by (O) shows the case where time slots close to each other are distributed to adjacent RFID readers (R1 and R2) 20.

Figure 11:
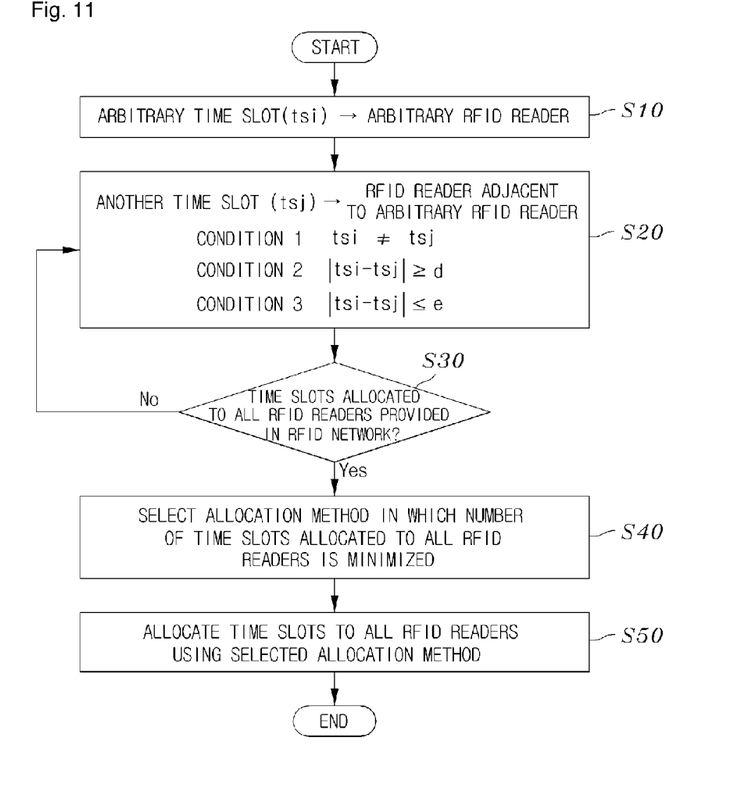
FIG. 11 is a flowchart schematically showing a time slot allocation method for preventing collisions between time slots according to the present invention.

FIG. 11 is a flowchart schematically showing a time slot allocation method for preventing collisions between time slots according to the present invention. As shown in FIG. 11, the time slot allocation method for preventing collisions between time slots according to the present invention starts in the following sequence.

First, an arbitrary time slot ($ts_i$) is allocated to an arbitrary RFID reader at step S10.

Thereafter, a time slot, which is different from the time slot ($ts_i$), and is non-successive to the time slot ($ts_i$) so as to eliminate temporal interference between respective RFID readers provided in the RFID network, is allocated to an RFID reader adjacent to the arbitrary RFID reader.

In this case, in order to read a moving RFID tag, time slots are allocated so that a certain number of time slots is interposed between the time slots allocated to the arbitrary and adjacent RFID readers at step S20.

Thereafter, whether time slots have been allocated to all RFID readers provided in the RFID network is determined at step S30. If it is determined at step S30 that time slots have been allocated to all RFID readers, an allocation method, in which the number of allocated time slots is a minimized, is selected from among a plurality of cases of allocation methods at step S40.

If it is determined at step S30 that time slots have not been allocated to all RFID is readers, the process returns to step S20 and allocates time slots so that time slots are allocated to all RFID readers provided in the RFID network.

Finally, at step S50, time slots are allocated to all RFID readers in the RFID network using the allocation method selected at step S40.

Figure 12:
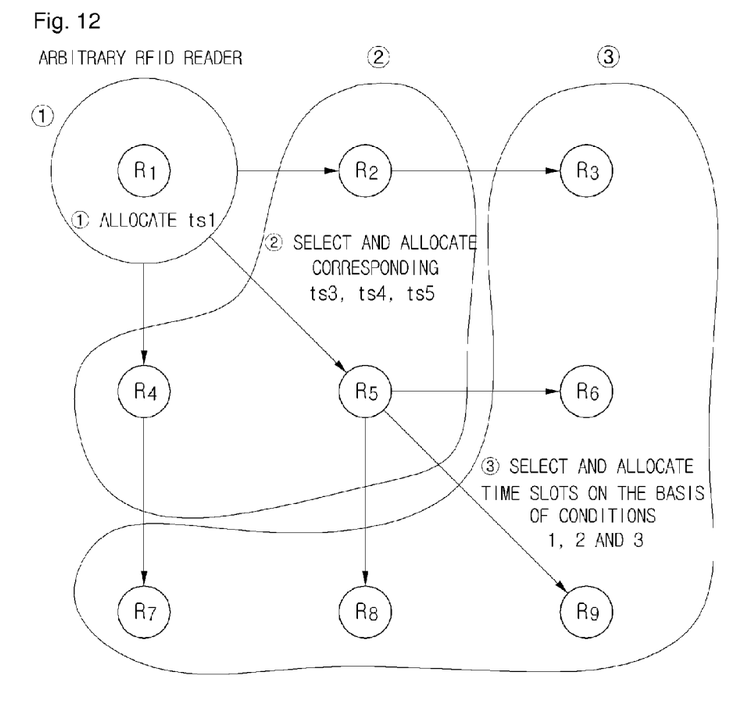
FIG. 12 is a diagram showing an embodiment of a time slot allocation method for preventing collisions between time slots according to the present invention.

FIG. 12 is a diagram showing an embodiment of a time slot allocation method for preventing collisions between time slots according to the present invention. As shown in FIG. 12, in the time slot allocation method for preventing collisions between time slots, a time slot $ts_1$ is allocated to an RFID reader $R_1$ (①).

Thereafter, time slots are distributed to RFID readers $R_2$, $R_4$, and $R_5$ adjacent to the RFID reader $R_1$, but corresponding time slots $ts_3$, $ts_4$, and $ts_5$ are selected and allocated to the RFID readers $R_2$, $R_4$, and $R_5$ on the basis of Math FIGS. 2, 3 and 4 (②).

Further, time slots are allocated to RFID readers $R_3$, $R_6$, $R_7$, $R_8$, and $R_9$ adjacent to the RFID readers $R_2$, $R_4$, and $R_5$, but are selected on the basis of the constraints of Math FIGS. 2, 3 and 4 and are allocated to the RFID readers (③).

In this case, the number of cases occurs depending on methods by which the RFID readers $R_2$, $R_4$, and $R_5$ select the time slots $ts_3$, $ts_4$, and $ts_5$, and the number of cases also occurs depending on methods by which the RFID readers $R_3$, $R_6$, $R_7$, $R_8$, and $R_9$ select respective time slots.

Therefore, time slots are allocated to RFID readers using the allocation method in which the total number of allocated time slots is minimized in respective cases, so that RFID tags can be sensed using a minimum scanning period.

As described above, the present invention having the above construction is advantageous in that, since the period for which RFID tags present in an RFID network are is scanned is shortened, the movement and fluctuation of RFID tags can be rapidly sensed, so that the sensing capability of RFID readers is increased, thus improving accuracy and reliability and enhancing the performance of a system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A time slot allocation apparatus for preventing collisions between time slots in a Time Division Multiple Access (TDMA)-based Radio Frequency Identification (RFID) network, the apparatus allocating time slots, obtained by dividing a same frequency band into unit time slots, to RFID readers for reading identification codes of RFID tags in the TDMA-based RFID network, comprising:
   a time slot allocation device configured to allocate time slots required for communication with the RFID tags to a plurality of RFID readers provided in the RFID network; and
   a collision prevention device configured to perform control such that the time slot allocation device allocates time slots to the plurality of RFID readers while distributing different and non-sequential time slots to adjacent RFID readers, thus preventing collisions from occurring between time slots allocated to the RFID readers,
   wherein the collision prevention device perform the control by using a first constraint, a second constraint and a third constraint,
   wherein the first constraint indicates that at least two RFID readers, which are sets of variables having time slots, don't use the same time slot as long as the at least two RFID readers are not spaced sufficiently far apart among the at least two RFID readers,
   wherein the second constraint indicates that non-sequential time slots are selected among time slots allocated to adjacent RFID readers,
   wherein the third constraint indicates that time slots are selected non-sequentially but as adjacently as possible among time slots allocated to adjacent RFID readers, and
   wherein the second constraint is given in the following:

$$|ts_i - ts_j| \geq d(d \approx 2)$$

where $ts_i$ represents an arbitrary time slot allocated to an arbitrary RFID reader of the at least two RFID readers, $ts_j$ represents a different time slot from the time slot $ts_i$ that is allocated to another of the at least two RFID readers adjacent to the arbitrary RFID reader, and is non-sequential to the time slot $ts_i$, and d represents the number of time slots interposed between allocated time slots $ts_i$ and $ts_j$.

2. The time slot allocation apparatus according to claim 1, wherein the collision prevention device is configured to perform control such that three to six time slots are interposed between the time slots allocated to the adjacent RFID readers in order to read each moving RFID tag.

3. The time slot allocation apparatus according to claim 1, wherein the collision prevention device is configured to perform control such that one to four time slots are interposed between time slots allocated to the adjacent RFID readers in order to eliminate temporal interference between the time slots.

4. The time slot allocation apparatus according to claim 1, wherein the collision prevention device is configured to enable a number of time slots allocated to all RFID readers provided in the RFID network to be minimized.

5. The time slot allocation apparatus according to claim 1, wherein both the time slot allocation device and the collision prevention device are provided in an RFID interface for connection to the RFID readers.

6. The time slot allocation apparatus according to claim 5, wherein the RFID interface is configured to control the RFID readers and collect identification codes of the RFID tags read by the RFID readers.

7. The time slot allocation apparatus according to claim 1, wherein each of the time slot allocation device and the collision prevention device further comprises an RFID reader management unit configured to allocate time slots to respective RFID readers using information about the RFID readers, which is input through an RFID interface for connection to the RFID readers.

8. The time slot allocation apparatus according to claim 7, wherein the RFID interface is configured to connect the RFID readers to respective components included in RFID middleware in which the RFID reader management unit is included.

9. The time slot allocation apparatus according to claim 8, wherein the RFID middleware comprises:
   the RFID interface provided to connect the RFID readers to respective components included in the RFID middleware;
   the RFID reader management unit connected through the RFID interface and configured to allocate time slots for communication to the RFID readers to prevent collisions from occurring between the time slots;

an RFID tag information management unit connected through the RFID interface and configured to collect and manage the identification codes of the RFID tags read by the RFID readers; and an application interface provided to connect the RFID middleware to a central server for controlling the RFID network.

10. The time slot allocation apparatus according to claim 1, wherein no RFID reader is interposed between the arbitrary RFID reader and the RFID reader adjacent to the arbitrary RFID reader.

11. A time slot allocation method for preventing collisions between time slots in a Time Division Multiple Access (TDMA)-based Radio Frequency Identification (RFID) network, the method allocating time slots, obtained by dividing a same frequency band into unit time slots, to RFID readers for reading identification codes of RFID tags in the TDMA-based RFID network, comprising:

(a) allocating, using a time slot allocation device that allocates the time slots for communication with the RFID tags to a plurality of RFID readers provided in the RFID network, an arbitrary time slot to an arbitrary RFID reader; and (b) allocating a time slot to an RFID reader adjacent to the arbitrary RFID reader using a collision prevention device to allocate the time slot that is different from the arbitrary time slot and is non-sequential to the arbitrary time slot to the adjacent RFID reader in order to eliminate temporal interference between respective RFID readers provided in the RFID network, wherein allocating time slots to the arbitrary RFID reader and the adjacent RFID reader comprises allocating so that a number of time slots is interposed between the time slots allocated to the arbitrary RFID reader and the adjacent RFID reader in order to read a moving RFID tag, wherein allocating time slots to the arbitrary RFID reader and the adjacent RFID reader further comprises using a first constraint, a second constraint and a third constraint, wherein the first constraint indicates that at least two RFID readers do not use the same time slot as long as the at least two RFID readers are not spaced sufficiently far apart among the at least two RFID readers, wherein the second constraint indicates that non-sequential time slots are selected among time slots allocated to adjacent RFID readers, wherein the third constraint indicates that time slots are selected non-sequential but as adjacently as possible among time slots allocated to adjacent RFID readers, and wherein the second constraint is given in the following:

$$|ts_i - ts_j| \geq d(d \approx 2)$$

where $ts_i$ represents the arbitrary time slot allocated to the arbitrary RFID reader, $ts_j$ represents the time slot allocated to the adjacent RFID reader, and d represents the number of time slots interposed between allocated time slots $ts_i$ and $ts_j$.

12. The time slot allocation method according to claim 11, wherein the number of time slots is 3 to 6.

13. The time slot allocation method according to claim 11, further comprising repeating (a) and (b) until time slots are allocated to all RFID readers provided in the RFID network.

14. The time slot allocation method according to claim 11, wherein the collision prevention device enables the number of time slots allocated to all RFID readers provided in the RFID network to be minimized.

15. The time slot allocation method according to claim 11, wherein the non-successive time slot is a time slot implemented such that two to four time slots are interposed between the time slots allocated to the arbitrary RFID reader and the adjacent RFID reader in order to prevent temporal interference between the allocated time slots.

* * * * *